Oct. 10, 1950     R. M. JOLLY     2,525,488
CONTROL SYSTEM
Filed Nov. 19, 1948
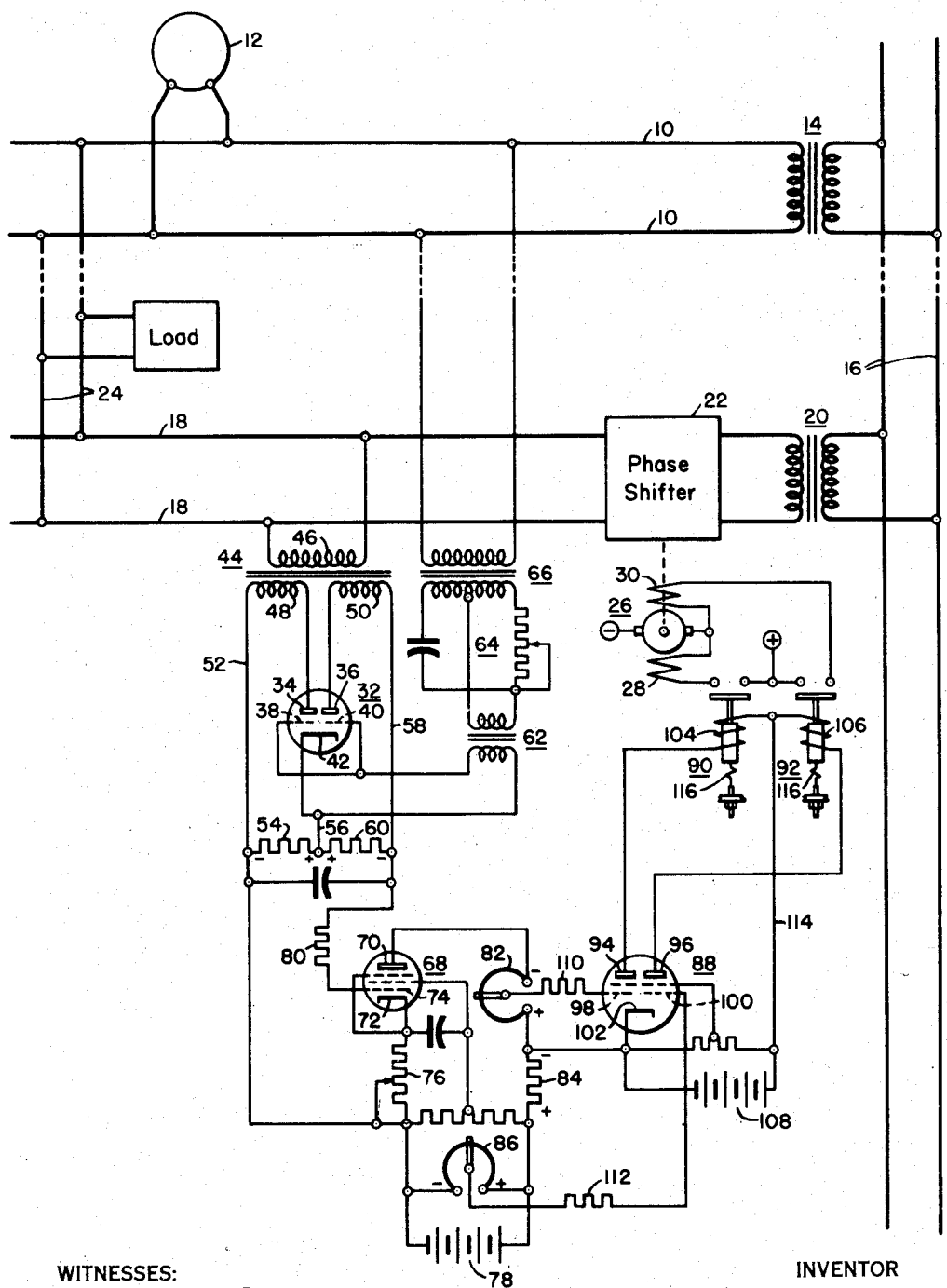
WITNESSES:
Robert C. Baird
Rev. L. Groove
INVENTOR
Robert M. Jolly.
BY
James N. Ely
ATTORNEY Patented Oct. 10, 1950

2,525,488

UNITED STATES PATENT OFFICE 2,525,488

CONTROL SYSTEM

Robert M. Jolly, Pittsburgh, Pa., assignor to Westinghouse Electric Corporation, East Pittsburgh, Pa., a corporation of Pennsylvania Application November 19, 1948, Serial No. 60,967

5 Claims. (Cl. 171—119)

This invention relates generally to electrical systems and in particular to control systems.

In practice, it is frequently necessary to tie or connect two power systems together. In such cases, it is necessary to minimize the flow of active power through the tie line. Attempts have been made heretofore to prevent such flow of active power by maintaining the angle difference between the voltages of the two systems at zero but these have not always been successful in that the intelligence required to operate known controls has necessitated the use of large power circuits with a resulting drain on the power systems or the controls utilized have lacked sensitivity.

An object of this invention is to provide for limiting or preventing the flow of active power in a tie line connected between two power systems.

Another object of this invention is the provision of an electronic control responsive to the angle of difference between the potentials of two power systems connected by a tie line for effecting the operation of a phase shifter in the input to one of the systems to adjust the potential thereof to a zero angle of difference with respect to the potential of the other one of the power systems to thereby prevent the flow of active power in the tie line therebetween.

Other objects of this invention will become apparent from the following description when taken in conjunction with the accompanying drawing, the single figure of which is a diagrammatic view of apparatus and circuits embodying the teachings of this invention.

Referring to the drawing, there is illustrated a power system represented by conductors 10 disposed to supply electrical apparatus 12 and connected through a large capacity transformer 14 to be supplied from a power source represented by conductors 16. The power source 16 also supplies a power system represented by conductors 18 through a transformer 20 and a suitable phase shifter represented by the rectangle 22. The phase shifter 22 may be of any suitable type such as a phase shifting transformer. Both of the power systems 10 and 18 are disposed to be maintained at the same angle of difference, a tie line 24 being connected therebetween.

In order to prevent or minimize the flow of active power through the tie line 24, it is necessary to adjust the phase shifter 22 to maintain the potential across conductors 18 at the same angle as the potential across conductors 10 whereby the angle of difference therebetween is zero. For this purpose, a motor 26 is disposed to be directionally operated to actuate the phase shifter 22 depending upon the selective energization of the field windings 28 and 30 of the motor 26.

In order to control the selective energization of the field windings 28 and 30, provision is made to obtain a pair of low ampere direct-current voltages which constitute measures of the angles of the potentials of the two power systems and the differential of such voltages constitute a measure of the angle of difference therebetween. For this purpose, a vacuum tube 32 having twin anodes 34 and 36, twin grids 38 and 40, respectively, and a common cathode 42 is utilized.

A transformer 44 is connected to supply the anode-cathode circuits of tube 32, the primary winding 46 of the transformer being connected across the power system 18. The transformer 44 is provided with two secondary windings 48 and 50, the adjacent ends of the secondary windings 48 and 50 being connected to anodes 34 and 36, respectively, whereby the potentials at anodes 34 and 36 are 180° apart. One of the anode-cathode circuits of the tube 32 extends from the anode 34 through the secondary winding 48 of transformer 44, conductor 52, resistor 54 and conductor 56 to the cathode 42 whereas the other anode-cathode circuit extends from the anode 36 through the secondary winding 50 of transformer 44, conductor 58, resistor 60 and conductor 56 to the cathode 42, the resistors 54 and 60 being connected in series circuit but in opposing polarity relation with respect to each other.

In order to control the conductivity of the anode-cathode circuits of tube 32, the grids 38 and 40 are connected to be simultaneously biased from the power system 10. In this instance, the grids 38 and 40 are connected through a grid transformer 62, a phase shifter 64 and a transformer 66 across conductors 10, the phase shifter 64 being so adjusted that the potential of the grids 38 and 40 is shifted 90° from the potential of conductors 10 when the potentials across the power systems 10 and 18 are at a zero angle of difference. By connecting the tube 32 in this manner, it is apparent that as the conductivity of one of the anode-cathode circuits of tube 32 is increased, the conductivity of the other one of the anode-cathode circuits is correspondingly decreased whereby the differential of the direct-current voltages appearing across resistors 54 and 60 is a direct measure of the angle of difference between the potentials across the power systems 10 and 18, the polarity of such measure depending upon which of the potentials is leading with respect to the other.

In order to amplify the signal voltage which is the differential of the direct-current voltages appearing across the series connected resistors 54 and 60, a vacuum tube amplifier 68 is utilized. The amplifier 68 is of the usual construction being provided with an anode 70, a cathode 72 and a control grid 74, the amplifier 68 being operated as a self-biased tube with a biasing resistor 76 being adjusted for a desired operating point, at which point current flows in the anode-cathode circuit from a source of supply represented by the battery 78. The bias of the control grid 74 is controlled by the differential of the voltages across the series connected resistors 54 and 60 which are connected in the grid-cathode circuit of the amplifier 68, which circuit extends from the grid 74 through resistor 80, series connected resistors 60 and 54 and the self-biasing resistor 76 to the cathode 72.

The anode-cathode circuit of the amplifier 68 extends from the anode 70 through a potentiometer resistor 82, resistor 84, battery 78 across which a potentiometer resistor 86 is connected and the self-biasing resistor 76 to the cathode 72. From the current flow in the anode-cathode circuit of the amplifier 68 by reason of the self-biasing of the tube, it is seen that the polarity of the voltages across resistors 82 and 84 are in opposition to the polarity of the voltage across the potentiometer resistor 86 which is connected across the battery 78.

As illustrated, a vacuum tube 88 is connected to control the selective energization of a pair of contactors 90 and 92 which control the selective energization of the field windings 28 and 30, respectively, of the motor 26. In this instance, the tube 88 comprises twin anodes 94 and 96, control grids 98 and 100 and a cathode 102 disposed for operation to selectively connect the energizing windings 104 and 106 of contactors 90 and 92, respectively, to a source of supply represented by the battery 108.

The control grid 98 is connected through a resistor 110 and a part of the potentiometer resistor 82 to the cathode 102, whereas the grid 100 is connected through resistor 112, a part of the potentiometer resistor 86 and resistor 84 to the cathode 102. In practice, the potentiometer resistors 82 and 86 are so adjusted when the tube 68 is operating as a self-biased tube, that the grids 98 and 100 are negatively biased to prevent either of the anode-cathode circuits of tube 88 from conducting. This will be appreciated where it is noted that the potentiometer 82 is connected to supply a negative bias to the grid 98 and that the resistor 84 and potentiometer 86 are connected in the biasing circuit of grid 100 whereby the resistor 84 supplies a positive bias and the potentiometer 86 supplies a negative bias.

In operation, with the potentiometer resistors 82 and 86 adjusted as described to cause a negative bias to be impressed upon the grids 98 and 100, respectively, and with the potentials of the grids 38 and 40 of tube 32 shifted 90° with respect to the potentials across the power systems 10 and 18 when such potentials have a zero angle of difference, each of the anode-cathode circuits of the tube 32 conducting over the same period of the positive half cycle with the result that the opposed direct current voltages across the series connected resistors 54 and 60 are equal and there is a zero differential thereacross.

If for some reason, the potential across the power system 10 should lead the potential across the power system 18 with the result that the angle of difference between the potentials of the two power systems is increased in a direction to advance the conductivity of the anode-cathode circuit including anode 34 and to retard the conductivity of the anode-cathode circuit including anode 36, then the direct-current voltage appearing across resistor 54 exceeds the voltage across resistor 60 with the result that the differential of the opposed direct-current voltage will be such as to apply a positive bias to the grid 74 to increase the conductivity of the amplifier 68. As the current flow in the anode-cathode circuit thereof increases, the voltage drop across the potentiometer resistor 82 increases whereby the negative bias applied to the grid 98 is increased to prevent the anode-cathode circuit of the tube 88 controlled thereby from conducting. At the same time, the voltage drop across resistor 84 is increased whereby the resistor 84 will supply sufficient positive bias to the grid 100 in opposition to the negative bias of the potentiometer resistor 86 to render the anode-cathode circuit of tube 88 controlled thereby conducting. This circuit extends from the anode 96 through the energizing winding 106 of the contactor 92, conductor 114 and the battery 108 to the cathode 102.

When the contactor 92 is thus energized, it is actuated to establish the energizing circuit for the field winding 30 of the motor 26 to effect an operation of the motor in a direction to operate the phase shifter 22 to effect a change in the angle of the potential across the power system to correct the angle of difference between the potentials of the power systems 10 and 18 to zero.

If on the other hand, the potential across the power system 18 should lead the potential across the power system 10 with the result that the angle of difference between the potentials of the two power systems is increased in a direction to retard the conductivity of the anode-cathode circuit including anode 34 and to increase the conductivity of the anode-cathode circuit including anode 36, then the differential of the opposed direct-current voltages across resistors 54 and 60 is such as to apply a less positive bias to the grid 74 to decrease the conductivity of the tube 68. As the conductivity of tube 68 is thus decreased, the voltage drop across the potentiometer resistor 82 and across resistor 84 decreases. The bias applied to the grid 98 of the tube 88 thus becomes less negative and the anode-cathode circuit controlled thereby becomes conducting. At the same time, the decrease in the voltage drop across resistor 84 decreases the positive bias applied therefrom in opposition to the negative bias from the potentiometer resistor 86 whereby the bias applied to the grid 100 of the tube 88 is so negative as to prevent the anode-cathode circuit controlled thereby from becoming conducting.

When the anode-cathode circuit controlled by the grid 98 becomes conducting, the winding 104 of the contactor 90 is energized, the energizing circuit thereof extending from the anode 94 through the winding 104, conductor 114, and the battery 108 to the cathode 102. When thus energized, the contactor 90 is operated to establish the energizing circuit for the field winding 28 of the motor 26 to effect the operation thereof in a direction to operate the phase shifter 22 to effect a change in the potential across the power system 18 to correct the angle of difference between the potentials of the power systems 10 and 18 to zero.

In practice, the contactors 90 and 92 have time delay characteristics, as indicated by the spring attachment 116 therefor whereby momentary variations from zero angle of difference between the potentials of the two power systems will not effect an operation of the phase shifter 22. If the variation, however, is sustained, then the control system is effective to correct the angle of difference between the two potentials to zero.

With the system described, telephone or other low power circuits can be employed in transmitting the intelligence from the power systems and especially in controlling the grid bias of the tube 32. The value of the sensitivity of the system will be appreciated when it is considered that the power systems are usually separated by several miles and that a low burden control system must therefore be utilized.

I claim as my invention:

1. In a system for limiting the flow of active power in a tie line connected between two power systems one of which is connected through a phase shifter to a high voltage power system, the combination comprising, a vacuum tube having a pair of anode-cathode circuits and a pair of control grids for the anode-cathode circuits, a transformer having two secondary windings, the transformer being connected to the power system having the phase shifter in circuit therewith, the two secondary windings being connected to the anode-cathode circuits, the two secondary windings supplying to the anodes of said vacuum tube potentials 180° apart, a circuit including low power conductors supplying a potential transformer connecting the pair of control grids to the other one of the power systems to impose a bias on the grids simultaneously, a phase shifter connected in said control grid circuit between the potential transformer and the grids for shifting the biasing potential on the grids 90° from the potentials of the power systems when the angle between the potentials of the power systems is zero, a resistor in each of the anode-cathode circuits, the resistors being connected in series circuit relation to provide a pair of opposed direct-current voltages the differential of which is a measure of the angle of difference between the potentials of the two power systems, another vacuum tube having a conductivity dependent upon the differential of said opposed direct-current voltages, a third vacuum tube having a pair of anode-cathode circuits disposed to be selectively rendered conducting depending upon the conductivity of said another tube, and means disposed to be selectively controlled in response to the selective conductivity of the anode-cathode circuits of the third tube to effect an operation of the phase shifter in circuit with the one power system to adjust the angle of the potential thereof to correspond to the angle of the potential of the other one of the power systems to thereby prevent a flow of active power in the tie line therebetween.

2. In a system for limiting the flow of active power in a tie line connected between two power systems one of which is connected through a phase shifter to a high voltage power system, the combination comprising, a vacuum tube having a pair of anode-cathode circuits and a pair of control grids for the anode-cathode circuits, a transformer having two secondary windings, the transformer being connected to the power system having the phase shifter in circuit therewith, the two secondary windings being connected to the anode-cathode circuits, the two secondary windings supplying to the anodes of said vacuum tube potentials 180° apart, a circuit including low power conductors supplying a potential transformer connecting the pair of control grids to the other one of the power systems to impose a bias on the grids simultaneously, a phase shifter connected in said control grid circuit between the potential transformer and the grids for shifting the biasing potential on the grids 90° from the potentials of the power systems when the angle between the potentials of the power systems is zero, a resistor in each of the anode-cathode circuits, the resistors being connected in series circuit relation to provide a pair of opposed direct-current voltages the differential of which is a measure of the angle of difference between the potentials of the two power systems, another vacuum tube having a control grid, means connecting the control grid of said another tube to be biased in response to the differential of said opposed direct-current voltages to control the conductivity of said another tube, vacuum tube means for providing a pair of anode-cathode circuits disposed to be rendered conducting, a control grid for each of said pair of anode-cathode circuits of said vacuum tube means, means connected in circuit relation with said control grids responsive to the conductivity of said another vacuum tube for selectively controlling the conductivity of the pair of anode-cathode circuits of said vacuum tube means, and means disposed to be selectively controlled in response to the selective conductivity of the pair of anode-cathode circuits of said vacuum tube means to effect an operation of the phase shifter in circuit with the one power system to adjust the angle of the potential thereof to correspond to the angle of the potential of the other one of the power systems to thereby prevent a flow of active power in the tie line therebetween.

3. In a system for limiting the flow of active power in a tie line connected between two power systems one of which is connected through a phase shifter to a high voltage power system, the combination comprising, a vacuum tube having a pair of anode-cathode circuits and a pair of control grids for the anode-cathode circuits, a transformer having two secondary windings, the transformer being connected to the power system having the phase shifter in circuit therewith, the two secondary windings being connected to the anode-cathode circuits, the two secondary windings supplying to the anodes of said vacuum tube potentials 180° apart, a circuit including low power conductors supplying a potential transformer connecting the pair of control grids to the other one of the power systems to impose a bias on the grids simultaneously, a phase shifter connected in said control grid circuit between the potential transformer and the grids for shifting the biasing potential on the grids 90° from the potentials of the power systems when the angle between the potentials of the power systems is zero, a resistor in each of the anode-cathode circuits, the resistors being connected in series circuit relation to provide a pair of opposed direct-current voltages the differential of which is a measure of the angle of difference between the potentials of the two power systems, another vacuum tube having a control grid, means connecting the control grid of said another tube to be biased in response to the differential of said opposed direct-current voltages to control the conductivity of said another tube, a third vacuum tube having twin anodes, grids and a cathode, means connected in circuit relation with the grids of said third tube and responsive to the conductivity of said another vacuum tube for selectively controlling the conductivity of the twin anode-cathode circuits of said third tube, and means disposed to be selectively controlled in response to the selective conductivity of the twin anode-cathode circuits to effect an operation of the phase shifter in circuit with the one power system to adjust the angle of the potential thereof to correspond to the angle of the potential of the other one of the power systems to thereby prevent a flow of active power in the tie line therebetween.

4. In a system for limiting the flow of active power in a tie line connected between two power systems one of which is connected through a phase shifter to a high voltage power system, the combination comprising, a vacuum tube having a pair of anode-cathode circuits and a pair of control grids for the anode-cathode circuits, a transformer having two secondary windings, the transformer being connected to the power system having the phase shifter in circuit therewith, the two secondary windings being connected to the anode-cathode circuits, the two secondary windings supplying to the anodes of said vacuum tube potentials 180° apart, a circuit including low power conductors supplying a potential transformer connecting the pair of control grids to the other one of the power systems to impose a bias on the grids simultaneously, a phase shifter connected in said control grid circuit between the potential transformer and the grids for shifting the biasing potential on the grids 90° from the potentials of the power systems when the angle between the potentials of the power systems is zero, a resistor in each of the anode-cathode circuits, the resistors being connected in series circuit relation to provide a pair of opposed direct-current voltages the differential of which is a measure of the angle of difference between the potentials of the two power systems, another vacuum tube having a control grid, means connecting the control grid of said another tube to be biased in response to the differential of said opposed direct-current voltages to control the conductivity of said another tube, vacuum tube means for providing a pair of anode-cathode circuits disposed to be rendered conducting, a control grid for each of said pair of anode-cathode circuits of said vacuum tube means, means connected in circuit relation with said control grids responsive to the conductivity of said another vacuum tube for selectively controlling the conductivity of the pair of anode-cathode circuits of said vacuum tube means, a pair of contactors disposed to be selectively operated depending upon the selective conductivity of the pair of anode-cathode circuits of said vacuum tube means, and a motor disposed for directional operation in response to the selective operation of the contactors to directionally operate the phase shifter in circuit with the one power system to adjust the potential thereof to a zero angle of difference with respect to the potential of the other one of the power systems to thereby prevent a flow of active power in the tie line therebetween.

5. In a system for limiting the flow of active power in a tie line connected between two power systems one of which is connected through a phase shifter to a high voltage power system, the combination comprising, a vacuum tube having a pair of anode-cathode circuits and a pair of control grids for the anode-cathode circuits, a transformer having two secondary windings, the transformer being connected to the power system having the phase shifter in circuit therewith, the two secondary windings being connected to the anode-cathode circuits, the two secondary windings supplying to the anodes of said vacuum tube potentials 180° apart, a circuit including low power conductors supplying a potential transformer connecting the pair of control grids to the other one of the power systems to impose a bias on the grids simultaneously, a phase shifter connected in said control grid circuit between the potential transformer and the grids for shifting the biasing potential on the grids 90° from the potentials of the power systems when the angle between the potentials of the power systems is zero, a resistor in each of the anode-cathode circuits, the resistors being connected in series circuit relation to provide a pair of opposed direct-current voltages the differential of which is a measure of the angle of difference between the potentials of the two power systems, another vacuum tube having a control grid, means connecting the control grid of said another tube to be biased in response to the differential of said opposed direct-current voltages to control the conductivity of said another tube, vacuum tube means for providing a pair of anode-cathode circuits disposed to be rendered conducting, a control grid for each of said pair of anode-cathode circuits of said vacuum tube means, means connected in circuit relation with said control grids responsive to the conductivity of said another vacuum tube for selectively controlling the conductivity of the pair of anode-cathode circuits of said vacuum tube means, a pair of contactors disposed to be selectively operated depending upon the selective conductivity of the pair of anode-cathode circuits of said vacuum tube means, time delay means associated with each of the contactors to prevent premature operation thereof, and a motor disposed for directional operation in response to the selective operation of the contactors to directionally operate the phase shifter in circuit with the one power system to adjust the potential thereof to a zero angle of difference with respect to the potential of the other one of the power systems to thereby prevent a flow of active power in the tie line therebetween.

ROBERT M. JOLLY.

REFERENCES CITED

The following references are of record in the file of this patent:

UNITED STATES PATENTS

| Number | Name | Date |
| --- | --- | --- |
| 2,429,636 | McCoy | Oct. 28, 1947 |

FOREIGN PATENTS

| Number | Country | Date |
| --- | --- | --- |
| 419,663 | Great Britain | Nov. 5, 1934 |